Jan. 28, 1964

A. PAUL 3,119,502

TRANSPORT VEHICLE FOR AIRCRAFT

Filed Jan. 16, 1961

INVENTOR

Adolf Paul

By Richard Lunt
Agt

Jan. 28, 1964 A. PAUL 3,119,502
TRANSPORT VEHICLE FOR AIRCRAFT
Filed Jan. 16, 1961 6 Sheets-Sheet 4
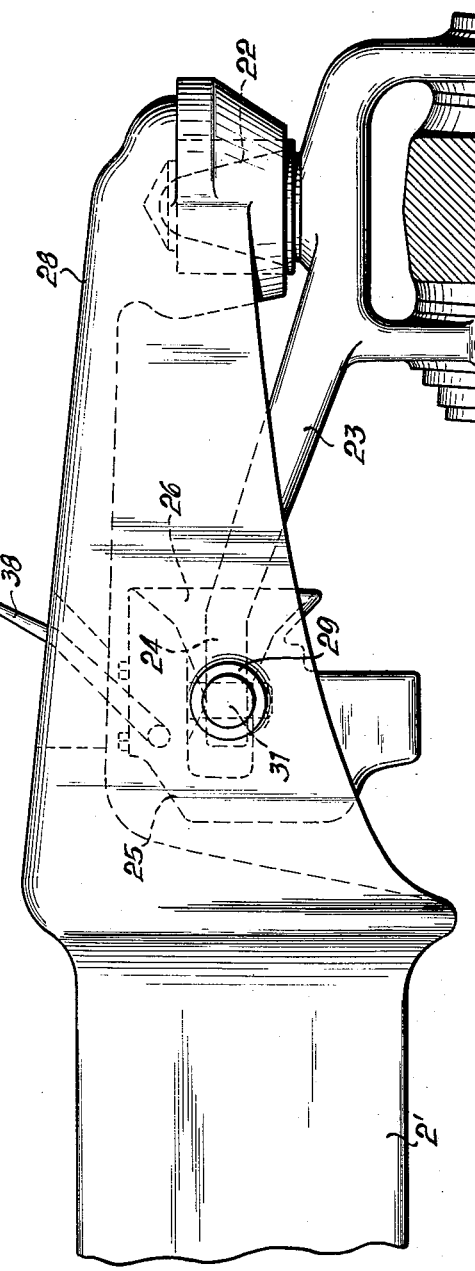
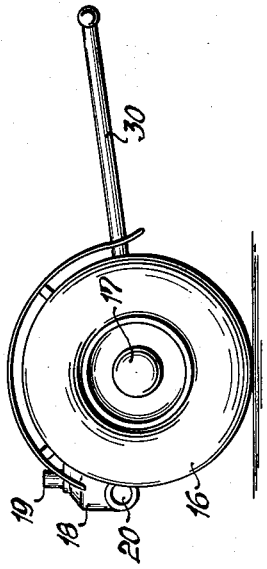
INVENTOR
Adolf Paul
By Richard Ernst
Agt

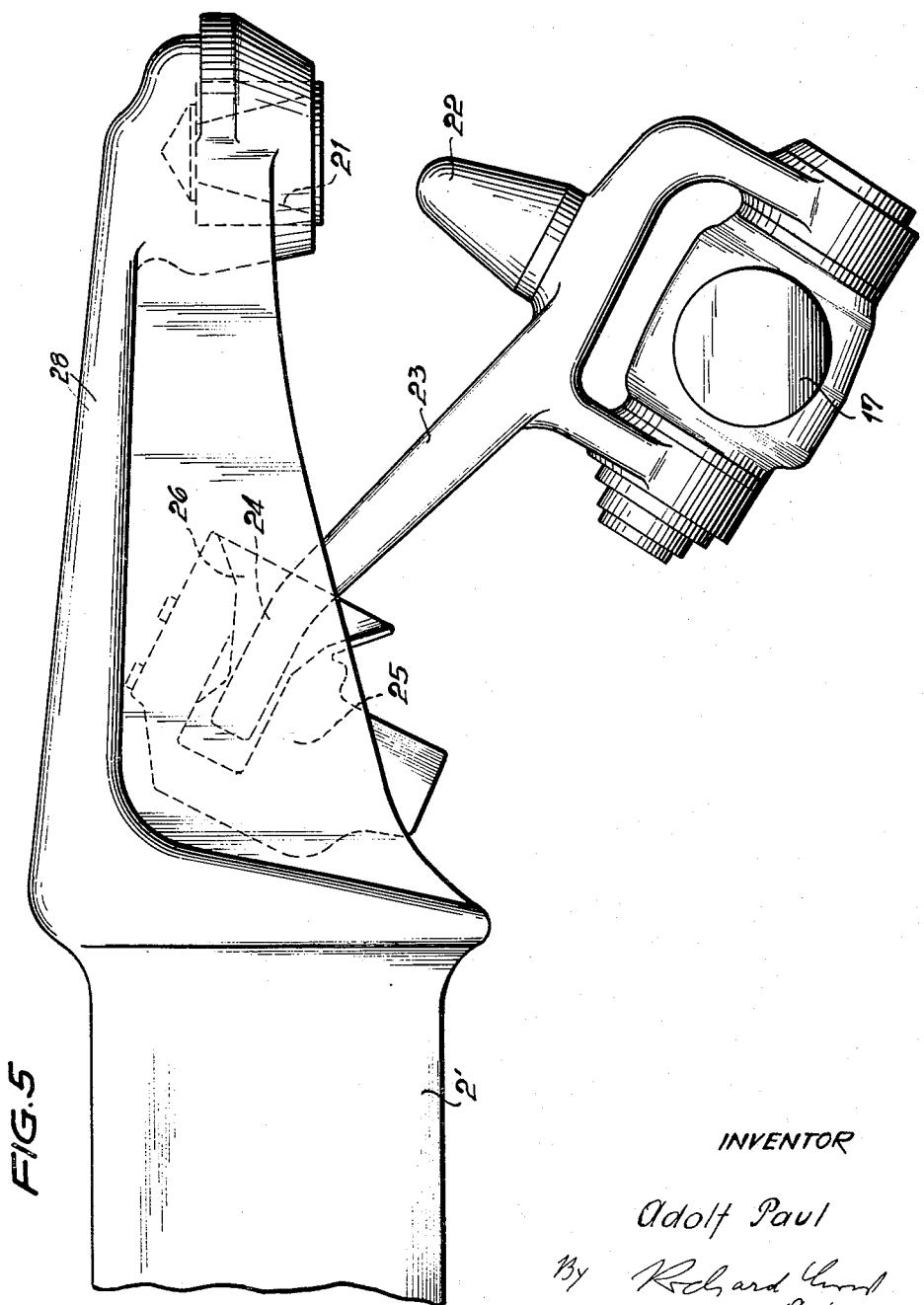

United States Patent Office 3,119,502
Patented Jan. 28, 1964

3,119,502
TRANSPORT VEHICLE FOR AIRCRAFT
Adolf Paul, Moosburg, Germany, assignor to Steinbock G.m.b.H., Moosburg, Upper Bavaria, Germany
Filed Jan. 16, 1961, Ser. No. 82,929
3 Claims. (Cl. 214—505)

This invention relates to transport vehicles for aircraft and the like, and more paricularly to vehicles of the type in which a frame for carrying the aircraft may be raised and lowered to facilitate loading and unloading.

An object of the invention is the provision of such a vehicle on which the load is evenly distributed over the several wheels or sets of wheels.

Another object is to provide such a vehicle with improved and simplified means for raising and lowering the carrying frame.

A further object is the provision of a vehicle the width of which transversely to the direction of movement may be reduced to a minimum in the unloaded condition.

With these and other objects in view the invention in its more specific aspects contemplates the use of rear wheels releasably secured to the vehicle frame for rotation about a fixed axis, and of jack means mounted on the frame near the rear wheels and extendable from the frame downward for supporting the frame on the ground.

These and other features of the invention will be more fully understood from the following detailed description of a preferred embodiment of the invention when taken in conjunction with the annexed drawing in which:

FIG. 4 is a side elevational view of a rear axle assembly of the vehicle of FIG. 1;

FIG. 5 shows a modified coupling device for the vehicle of FIG. 1 in side elevation in the position assumed during coupling or uncoupling;

FIG. 6 shows the device of FIG. 5 during transportation of an airplane;

Figure 1:
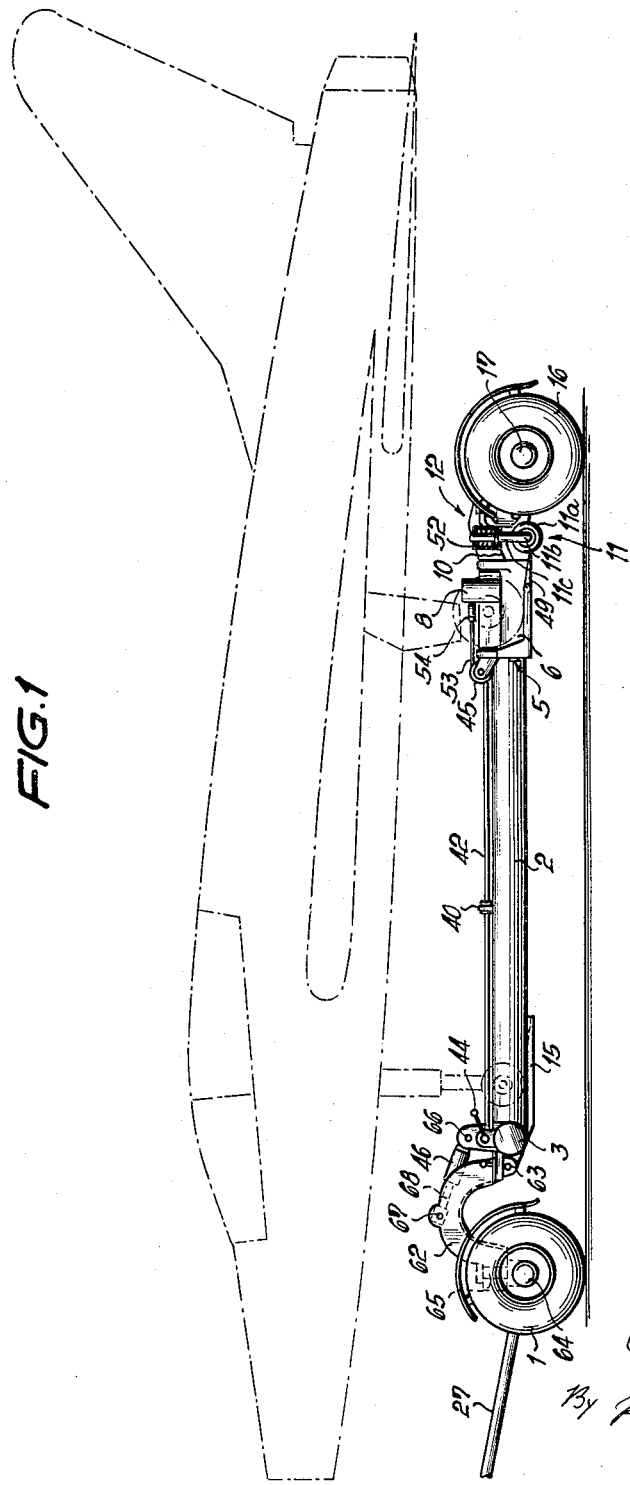
FIG. 1 shows a vehicle of the invention in side elevation as arranged for transporting an airplane.

Referring now to the drawing in detail and initially to FIG. 1, there is seen a vehicle carrying an airplane shown in phantom view. Since the airplane itself is not a part of this invention it will not be described in detail. The vehicle has a front axle 64 carrying wheels 1 which are pivotable about a vertical axis on the vehicle frame, an A-frame having two heavy tubular side rails 2 and a tubular cross member 3 at the front end. A support for the nose wheel of the plane is provided by a plate 15 which is fixedly fastened to both side rails 2 and the cross member 3. The rear edge of the plate 15 is tapered to provide a ramp for the nosewheel of the plane when the vehicle frame is lowered to the ground.

The rear end of the vehicle frame is supported on two releasable rear wheel sets, the wheels 16 of each of which are mounted on a common axle 17. Cantilevered brackets 5 are pivoted to the side rails 2 on either side of the frame and carry a pan 6 which forms a well receiving a main landing wheel of the plane. Each bracket 5 is equipped with a hydraulic jack 8 located intermediate the pivoting axis of the bracket 5 and the pan 6. The axis of the jack is substantially vertical and its piston may be extended downward as will become more fully apparent hereinafter. In the position illustrated in FIG. 1, the jack is retracted. The bracket 5 has an arm 10 fixedly fastened thereto. A roller assembly 11 consisting of a roller 11a, a yoke 11b in which the roller is rotatably supported, and a pivot pin 11c is vertically slidable in the arm 10 and is urged downward by a strong helical spring 52. The wheel sets 16 are releasably secured to the vehicle frame by a latch coupling device 12 the detailed features of which will become apparent hereinafter.

A winch 45 is rotatable on the bracket 5 about a horizontal axis, as seen in FIG. 1, which is perpendicular to the direction of vehicle movement. The winch 45 rotates when a crank 44 near the forward end of the side rail 2 is turned. Movement is transmitted from the crank 44 to the winch 45 by a linkage which includes rods 42 supported in bearing blocks 40.

The front axle 64 is attached to the vehicle frame by a wheel bracket 62 which is a heavy U-channel bent into an approximate U-shape, with the open side of the channel facing outward. The front end of the bracket 62 carries a single vertical king pin 65 about which the front axle assembly pivots for steering the vehicle. The rear end of the bracket 62 is hinged to the vehicle frame by a pivot pin 63 the axis of which is approximately horizontal, and transverse of the direction of vehicle movement in all normal operating positions of the vehicle. Pivoting movement of the bracket 62 about the pin 63 is controlled by a double-acting hydraulic motor 46 the cylinder member of which is hinged to a block 66 on the cross member 3 in the median plane of the vehicle, and the piston member 68 of which is attached to a cross member 67 journaled in the flanges of the bracket 62.

Figure 2:
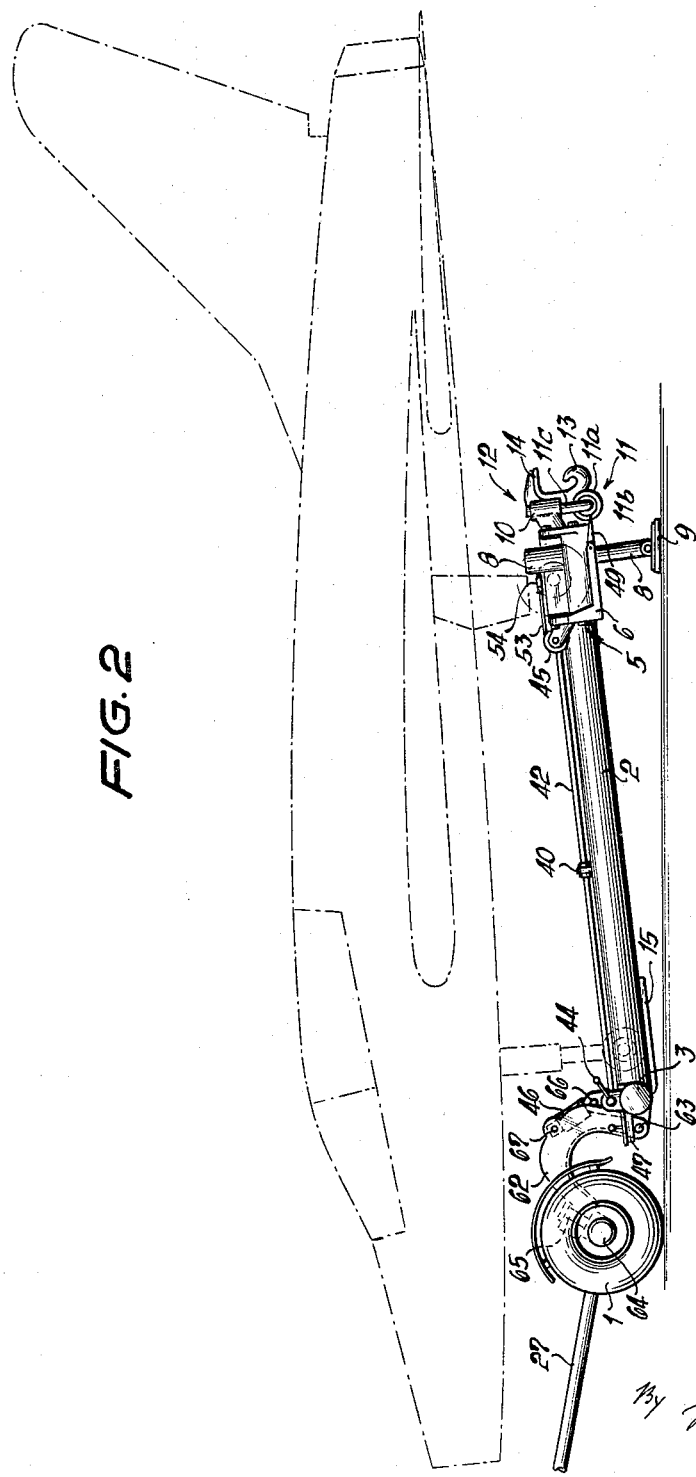
FIG. 2 shows the vehicle of FIG. 1 in an intermediate stage of the loading or unloading operation.

As seen in FIG. 1, the vehicle is ready to be towed by a tractor to be attached to draw bars 27 which are pivoted to the front axle 64. FIG. 2 shows the same vehicle in an intermediate stage during the loading or unloading operation in which the front end of the vehicle frame is lowered by the hydraulic motor 46 the piston member 68 of which is fully retracted. The sets of rear wheels 16 have been released and the weight of the rear end of the vehicle is supported on the hydraulic jacks 8 which are extended downward until their hingedly attached base plates 9 rest on the ground. The airplane is prevented from any movement on the frame of the vehicle by ropes 53 on either side of the vehicle one end of which is wound around the corresponding winch 45 whereas the other end carries a hook 54 which engages a corresponding recess in the landing gear of the airplane.

FIG. 2 shows the frame portion of the latch coupling devices 12 for attaching the rear wheel sets 16. One coupling device 12 is provided at the free end of each of the two side rails 2. Its frame portion consists of two laterally spaced hook shaped jaws 13 which are arcuately bent about a common horizontal axis of curvature and are open at the top. A forked jaw member 14 is spacedly superimposed on the hooked shaped jaw members in such a manner that each of the free end portions of the forked member 14 is approximately vertically aligned with one of the hooks.

Figure 3:
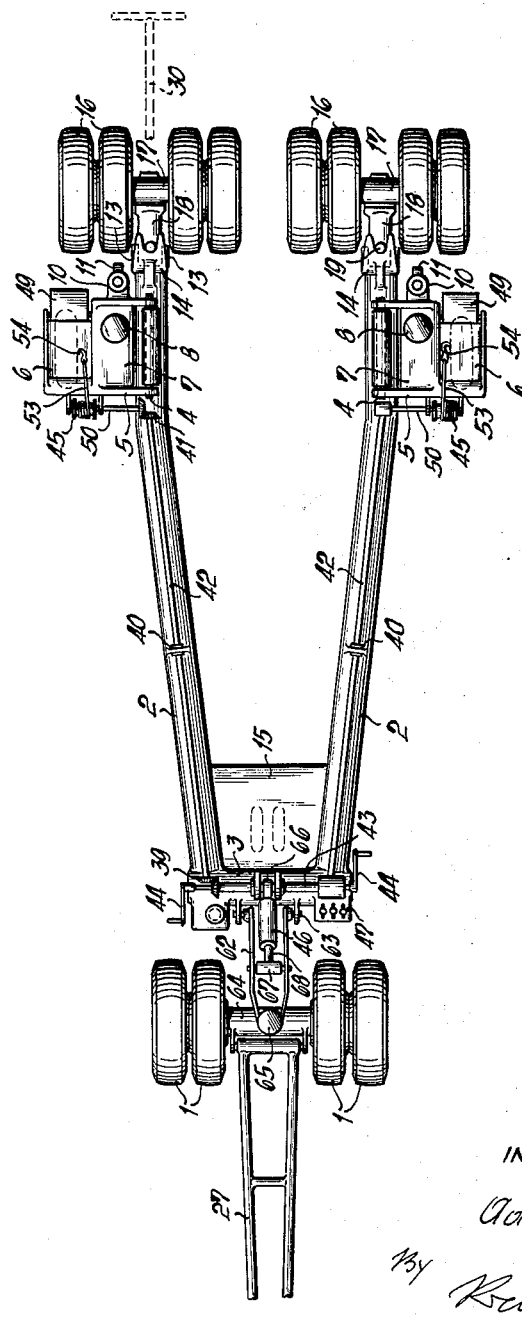
FIG. 3 illustrates the vehicle of FIG. 1 in plan top view.

This is better seen from FIG. 3 which shows the vehicle of FIG. 1 in top plan view. The two free fork ends of each jaw member 14 define a vertical passage therebetween which in the attached condition of the rear wheel sets 16 is engaged by a normally vertical pin 19 fixedly secured to the axle 17 of each of the two sets of rear wheels 16 by an arm 18. The rear axle assemblies including the wheel sets 16 may be wheeled toward and away from the vehicle by a detachable pole 30. A horizontal pin 20 laterally projects from the arm 18, as seen in FIG. 4, and engages the hook shaped jaws 13. When a rear axle assembly is attached to the latch coupling 12, the vertical pin 19 in engagement with the forked jaw 14 prevents rotation of the axle 17 about a transverse horizontal axis and forward movement of the rear axle relative to the frame. Engagement of the horizontal pin 20 with the hook-shaped jaw prevents rotation about a vertical axis and backward movement of the rear axle relative to the frame. Abutment of the forked jaw member 14 against the top of the arm 18 under the weight of the frame and its load prevents vertical movement of the rear axle and holds the two halves of the coupling in the engaged poistion. Yet, the rear wheel sets may easily be slipped out of the coupling when the weight of the vehicle is taken up by the hydraulic jacks 8.

As seen in FIG. 3, the brackets 5 are attached to the side rails 2 by shafts 4, which extend longitudinally of the rails, and carry a heavy plate member 7 to which the pans 6 for the main landing wheels of the airplane are laterally fastened, as viewed in FIG. 3. A ramp 49 is hinged to each pan 6. It may be lowered to facilitate rolling of the plane landing wheels onto the pan 6, or raised to assist in securing the wheel on the pan.

The winches 45 are rotatably mounted on the front edge of the bracket 5. They are each driven by a shaft 50 which pivots about the axis of the shaft 4 with the bracket 5 and is actuated by a bevel gear arrangement 41 to which motive power is transmitted from a transverse shaft 43 near the front end of the vehicle frame by bevel gears 39 and the rods 42 which are journaled in blocks 40. The transverse shaft 43 carries cranks 44 on both ends so that two men standing on opposite sides of the vehicle may jointly actuate the two winches 45 the movements of which are synchronized. The airplane is pulled into proper position on the vehicle by the winches 45 and may be discharged from the vehicle by gravity in a controlled manner by lowering the rear end of the frame and gradually releasing the ropes 53. The control valves 47 for actuating the several hydraulic devices of the vehicle are arranged at the front end of the vehicle frame adjacent the cranks 44. It will be understood that the hydraulic system of the vehicle also includes the necessary conduits connecting the control valves 47 to the several hydraulic devices and to a source of pressure fluid such as a pump and oil storage tank located on the tractor which pulls the device. The pump and tank could of course also be provided on the vehicle itself and equipped with a suitable prime mover, such as an internal combustion engine if so desired. Since such details of hydraulic systems are well known they have not been shown in the drawing for the sake of clarity.

A different arrangement for attaching the sets of rear wheels 16 to the vehicle frame is shown in FIGS. 5 and 6. The alternative coupling device is shown in FIG. 5 in side elevational view in an intermediate stage during attaching of a rear axle 17, and in FIG. 6 in the fully attached condition.

The free ends of the side rails 2' carry rearwardly projecting integral extensions 28 each of which defines two downwardly open cavities. The outer cavity 21 is conical and flares in a downward direction. It matingly receives a conical portion 22 of an arm 23 which is mounted on the rear axle 17 from which in the showing of FIGS. 5 and 6 the wheels 16 have been removed. The rear axle is thus pivotally supported in the conical cavity 21. A portion of the arm 23 which extends radially from the axis of the conical portion 22 forms a lunette 24 which is received in the throat 26 of a hitch member 25. The hitch member is pivotable on two stub shafts 29 about a horizontal axis. The stub shafts 29 are secured to the extension 28 in the cavity thereof nearer the free end of the side rail 2'. The lunette 24 is secured in the hitch member 25 by a coupling pin 31 the axial movements of which are controlled by a bellcrank lever 38 one arm of which passes outwardly through an opening in the extension 28. Motion is transmitted from the lever 38 to the pin 31 by the second arm of the lever (not shown) a longitudinal slot of which engages a transverse pin on the coupling pin 31.

The alternative coupling device shown in FIGS. 5 and 6 is disengaged by raising the rear end of the vehicle frame on the jacks 8 until the conical portion 22 of the arm 23 clears the conical cavity 21 as seen in FIG. 5. The coupling pin 31 is then raised by means of the lever 38 and the rear axle 17 with its wheels 16 may be withdrawn from the frame by the removable pole 30. For attaching the wheel sets, their lunettes 24 are slipped into the throats 26 of the hitch members 25 and secured by means of the pins 31 while the conical arm portions 22 are vertically aligned with the corresponding cavities 22. When the jacks 8 are then withdrawn, the weight of the vehicle is transmitted to the wheels by the coupling.

Figure 7:
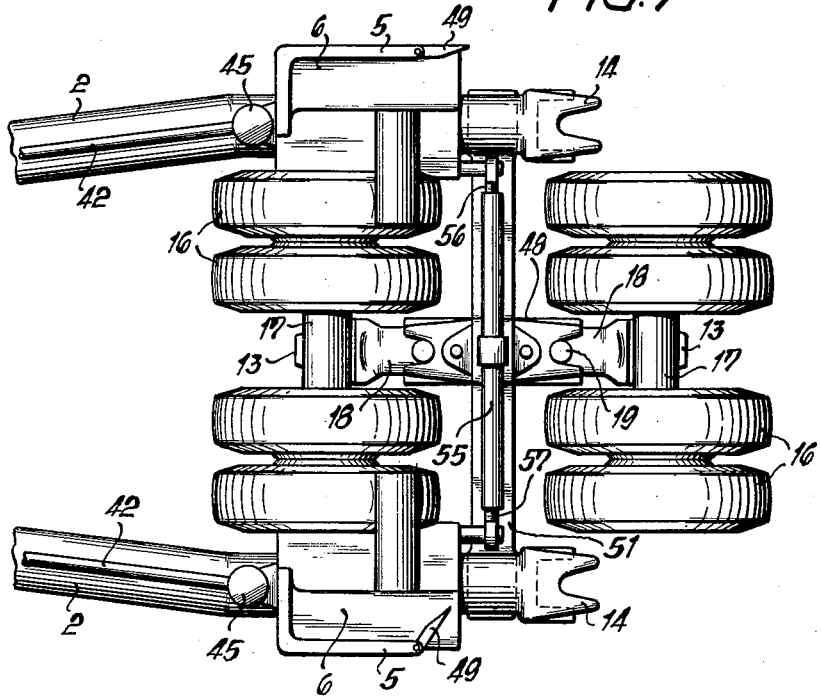
FIG. 7 is a partial plan view of the vehicle of FIG. 1 arranged for travel without load.
Figure 8:
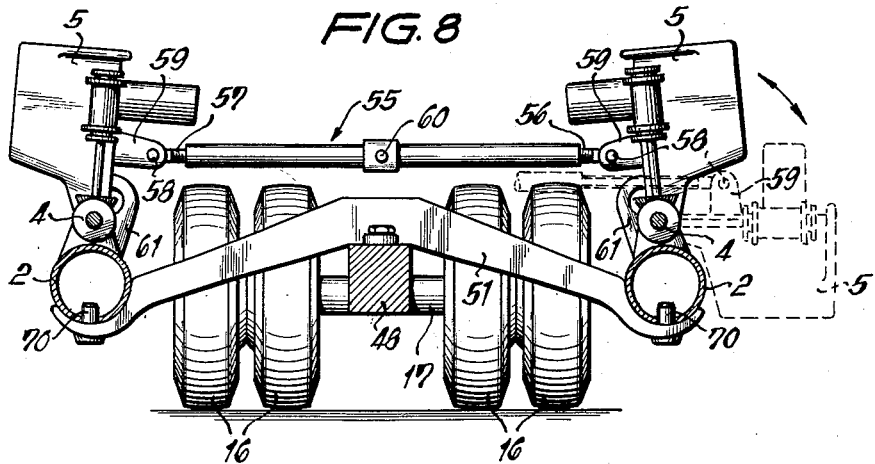
FIG. 8 is a rear elevational sectional view of the vehicle of FIG. 7.

FIGS. 7 and 8 show the rear end of the vehicle of FIG. 1 when arranged for travel over roads without load with minimum lateral clearance requirements. FIG. 7 is a fragmentary plan view, and FIG. 8 a sectional rear elevation of the vehicle.

The brackets 5 with the elements supported thereon are swung in an upward arc about the shafts 4 as best seen from FIG. 8 which also shows the operative position of one bracket in dotted lines. The brackets are raised and secured in the raised position by a turnbuckle arrangement 55 comprising a tubular member 60 the two axial halves of which have internal threads of opposite pitch, so that the thread in one half of the tubular member 60 is right handed whereas it is left handed in the other half. Two oppositely threaded rods 56, 57 engages the two halves of the tubular member 60. Their free ends are pivoted to apertured lugs 59 on the brackets 5 by pins 58 fixed on the rods. The turnbuckle assembly including the two pins 58 is removed from the vehicle frame when the brackets 5 are in the operative position. The brackets and the elements of the vehicle supported thereon are secured in the traveling position shown in FIG. 8 when the brackets 5 are drawn by the turnbuckle arrangement 55 into abutting engagement with stop members 61 fixedly mounted on the side rails 2.

When the vehicle travels under load, the wheel sets 16 laterally project from the vehicle frame to improve the lateral stability of the vehicle. During unloaded travel they woudl unnecessarily increase the overall width. Means are therefore provided to mount the two sets of wheels 16 in tandem between the free ends of the rails 2.

When traveling over roads and the like, the rear end of the vehicle frame is supported on a releasable cross member 51 which is held in position relative to the side rails 2 by two pins 70 engaging corresponding openings on the underside of the side rails. A twin coupling member 48 is flanged to the cross member 51 and extends therefrom forward and backward in the direction of vehicle movement. The two ends of the coupling member are each equipped wtih a coupling device identical with the frame portion of the aforedescribed coupling device 12 and operative to couple the two sets of rear wheels 16 in tandem fashion to the cross member 51 intermediate the free ends of the side rails 2. The cross member 51 with the twin coupling member 48 forms a detachable unit which is removed at least during the loading and unloading operation. As shown in FIGS. 7 and 8 it is held to the side rails 2 by the weight of the vehicle only, but suitable fastening means of a conventional nature may additionally be provided without departing from the spirit of this invention. When equipped with such fastening means, the cross member 51 may conveniently be carried in its operating position when the vehicle travels under load.

The transport vehicle described above is operated as follows:

Assuming that the vehicle is initially in the condition of the rear end shown in FIGS. 7 and 8, and in the condition of the front end seen in FIG. 1, that is, arranged for travel over a road without load, the jacks 8 are first extended to relieve the rear wheels 16 of their load. The wheels are uncoupled from the cross members 51 and rolled aside, and the cross member 51 is removed. The brackets 5 are lowered from the fully drawn position shown in FIG. 8 to that indicated in broken lines.

The jacks 8 are now withdrawn and the weight of the rear end of the empty vehicle is lowered onto the rollers 11a. The springs 52 are suitably dimensioned to keep the rear end of the vehicle off the ground so that the vehicle may be maneuvered into proper alignment with the airplane to be loaded. This maneuvering is greatly facilitated by the pivotal suspension of the rollers 11a. The front end of the vehicle is then lowered by withdrawing the piston 68 into the hydraulic motor 46.

The hooks 54 are engaged in suitable openings in the landing gear of the airplane, and the latter is drawn onto the vehicle by rotation of the winches 45. The transmission ratio from the hand crank 44 is suitably selected to make manual operation possible, but the winches 45 may be power operated, if desired. The added weight of the airplane further compresses the springs 52 until the pans 6 rest on the ground.

The rear end of the vehicle is raised by means of the jacks 8 into the position illustrated in FIG. 2 in which the latch coupling device 12 is somewhat higher than in the position seen in FIG. 1. The two wheel sets 16 are rolled into respective positions of alignment of the arms 18 with the frame portions of the coupling devices 12. By lowering the pole 30, the horizontal pin 20 is positioned before the jaw opening between the upper forked jaw 14 and the hook shaped jaws 13. The wheels 16 are then pushed forward to engage the vertical pin 19 in the forked jaw. When both wheel sets are in place, the jacks 8 are withdrawn and the weight of the vehicle with the airplane supported thereon locks the coupling. The modified coupling shown in FIGS. 5 and 6 operates in an analogous manner that does not require additional description.

When the front end of the vehicle frame is then raised by moving the piston 68 outward of the hydraulic motor 46, the vehicle is ready to be towed. To discharge the airplane, the above sequence of operations is substantially reversed.

The front end is lowered and the rear end is raised on the jacks 8 whereupon the wheels 16 may be removed. When the jacks 8 are withdrawn, the pans 6 are lowered to ground level and the airplane may be rolled off the vehicle. The rear end is then supported on the rollers 11a and the vehicle may be towed over a small distance if desired. Normally, the rear end will be raised by the jack 8 and the wheels will be attached in the position shown in FIGS. 7 and 8. The brackets 5 are pivoted upward and secured in the pivoted position. The front end of the vehicle is raised and it is ready for travel over a road.

It should be understood, of course, that the foregoing disclosure relates to only a preferred embodiment of the invention and that it is intended to cover all changes and modifications of the example of the invention herein chosen for the purpose of the disclosure which do not constitute departures from the spirit and scope of the invention set forth in the appended claims.

What I claim is:

1. A vehicle for transporting aircraft and the like in a predetermined direction comprising, in combinations:
    (a) a frame having two end portions spaced from each other in said direction;
    (b) an axle;
    (c) a plurality of wheels for supporting one of said end portions, said plurality of wheels being rotatable on said axle;
    (d) releasable fastening means for securing said axle to said one end portion in fixed spatial relationship to said frame, said fastening means including
        (d1) a frame portion and an axle portion, said portions being fixedly fastened to said frame and to said axle respectively,
        (d2) one of said fastening means portions including two laterally spaced hook members each defining a downwardly closed arc about an axis of curvature transverse of said direction, and a forked jaw member having two free end portions respectively spacedly superposed on said hook members, said free end portions defining therebetween a passage transverse of said axis, and
        (d3) the other one of said fastening means portions including two fixedly connected pin members having respective axes substantially perpendicular to one another, and respectively engageable simultaneously in said hook members and in said passage;
    (e) jack means on said one end portion and extendable therefrom in a downward direction for supporting said one end portion on the ground; and
    (f) a plurality of spaced well means on said frame for receiving spaced portions of an aircraft and the like.

2. A vehicle for transporting aircraft and the like in a predetermined direction comprising, in combinations:
    (a) a frame having two end portions spaced from each other in said direction;
    (b) an axle;
    (c) a plurality of wheels for supporting one of said end portions, said plurality of wheels being rotatable on said axle;
    (d) releasable fastening means for securing said axle to said one end portion in fixed spatial relationship to said frame, said fastening means including
        (d1) a frame portion and an axle portion, said portions being fixedly fastened to said frame and to said axle respectively,
        (d2) one of said fastening means portions being formed with a conically shaped recess having a substantially vertical axis and flaring toward an orifice, and
        (d3) the other fastening means portion including a conical member adapted to engage said recess,
        (d4) lunette means on said axle radially extending relative to said axis, and
        (d5) hitch means on said one end portion for receiving said lunette means so as to secure said axle against rotation about said axis;
    (e) jack means on said one end portion and extendable therefrom in a downward direction for supporting said one end portion on the ground; and
    (f) a plurality of spaced well means on said frame for receiving spaced portions of an aircraft and the like.

3. A vehicle for transporting aircraft and the like in a predetermined direction comprising, in combination:
    (a) a frame having two end portions spaced from each other in said direction;
    (b) a plurality of wheels for supporting one of said end portions;
    (c) releasable fastening means for securing said wheels to said end portion in fixed spatial relationship to said frame;
    (d) jack means on said one end portion and extendable therefrom in a downward direction for supporting said one end portion on the ground;
    (e) a plurality of spaced well means on said one end portion for receiving spaced portions of an aircraft and the like, each of said well means being pivoted to said one end portion for movement between an operative position in which said well means laterally project from said one end portion, and an inoperative position upwardly pivoted from said operative position;
    (f) means for securing said well means in said inoperative position; and
    (g) winch means mounted on said well means for rotation about an axis which extends radially relative to the axis of pivoting movement of said well means and is substantially horizontal when said well means are in the operative position thereof.

References Cited in the file of this patent

UNITED STATES PATENTS

| | | |
|---|---|---|
| 1,230,326 | Puderbaugh | June 19, 1917 |
| 2,010,969 | Soulis | Aug. 13, 1935 |
| 2,248,080 | Hathaway | July 8, 1941 |
| 2,411,183 | Baldwin | Nov. 19, 1946 |
| 2,431,388 | Fitzpatrick | Nov. 25, 1947 |
| 2,757,936 | McCavey | Aug. 7, 1956 |
| 2,798,729 | Paul | July 9, 1957 |
| 2,980,270 | Elliott et al. | Apr. 18, 1961 |

FOREIGN PATENTS

| | | |
|---|---|---|
| 477,423 | Great Britain | Dec. 30, 1937 |